United States Patent [19]

Legrand

[11] 4,037,809
[45] July 26, 1977

[54] DEVICE FOR MOUNTING A TURBOREACTOR ON AN AEROPLANE

[75] Inventor: Paul Joseph Legrand, Vaux le Penil, France

[73] Assignee: Societe Nationale d'Etude et de Construction de Moteurs d'Aviation, Paris, France

[21] Appl. No.: 631,196

[22] Filed: Nov. 12, 1975

[30] Foreign Application Priority Data

Nov. 13, 1974 France .................................. 74.37468

[51] Int. Cl.² .................... B64D 27/16; B64D 29/08
[52] U.S. Cl. .................................. 244/54; 60/226 R; 181/33 HD; 248/5
[58] Field of Search ................... 244/54, 53, 120, 119; 60/39.31, 39.32, 226 R, 262; 181/33 HB, 33 HD; 239/165.29, 165.31, 165.33, 165.37; 248/5

[56] References Cited

U.S. PATENT DOCUMENTS

| | | | |
|---|---|---|---|
| 2,783,003 | 2/1957 | Ralston et al. | 244/54 |
| 2,958,480 | 11/1960 | Saulnier | 244/54 |
| 2,982,497 | 5/1961 | Worley | 244/54 |
| 3,084,507 | 4/1963 | Kleinhans et al. | 181/33 HD |
| 3,194,515 | 7/1965 | Cohan | 244/54 |
| 3,637,042 | 1/1972 | Raynes | 181/33 HD |

Primary Examiner—Trygve M. Blix
Assistant Examiner—Galen L. Barefoot
Attorney, Agent, or Firm—Watson, Cole, Grindle & Watson

[57] ABSTRACT

A device for mounting in a nacelle on an airframe a turbojet engine contained by a casing, the device being of the type comprising a mast member integral with the airframe, a nacelle coaxial to the turbojet engine, quick release locking members connecting the compressor casing to the rear nacelle section, and elements for releasably connecting the rear nacelle section to the mast member wherein the device further comprises sliding guides permitting the nacelle to be displaced parallel to the longitudinal axis of the engine, along the mast member between an active and advanced position in which the rear nacelle section is supported against the casing of the compressor, and an inactive or remote position, in which the rear nacelle section is separate from the casing, and links directly connecting the casing of the engine to the mast with a view to ensuring support of the turbojet engine when the rear nacelle section is in the inactive or remote position.

9 Claims, 8 Drawing Figures

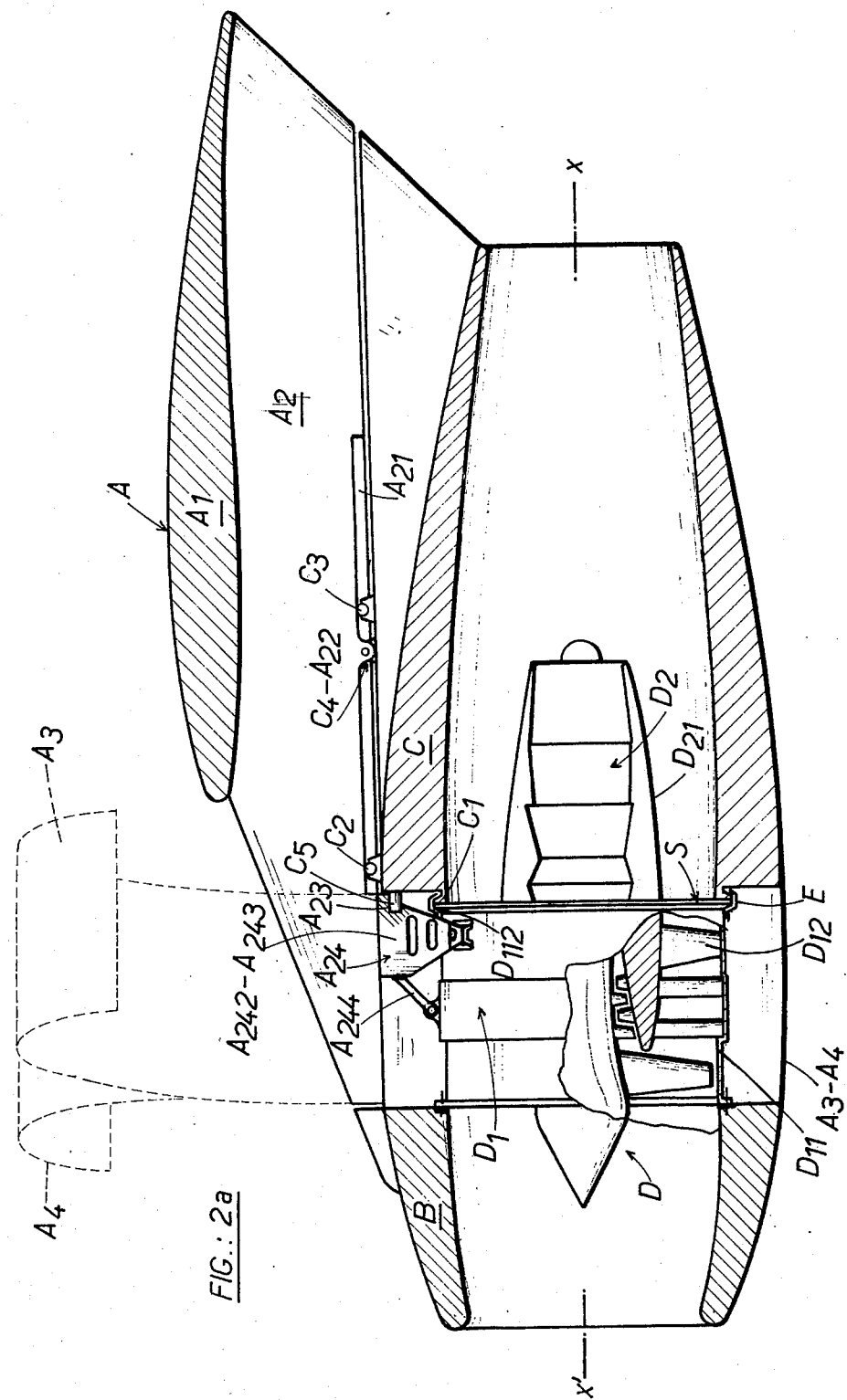
FIG.: 2a

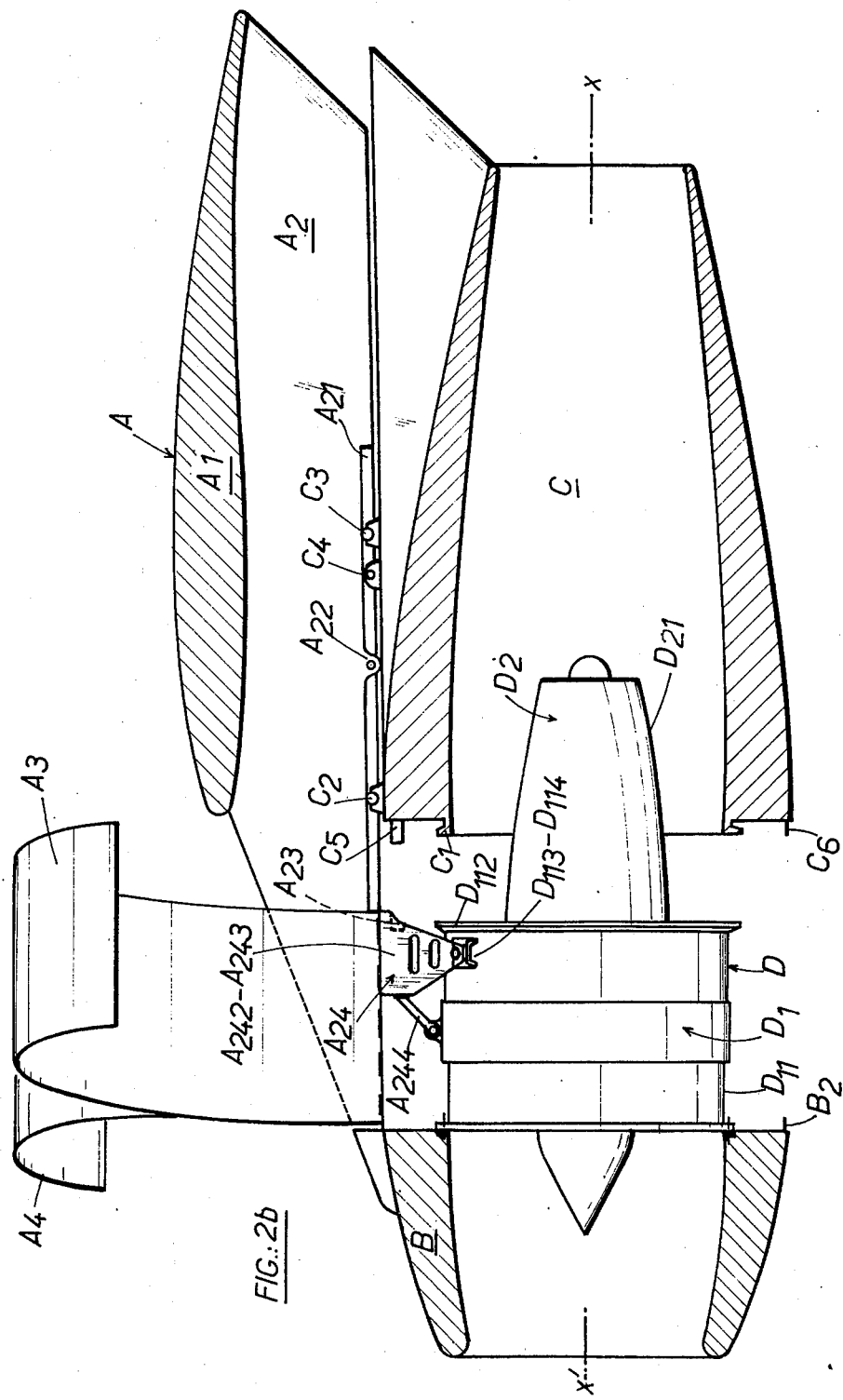

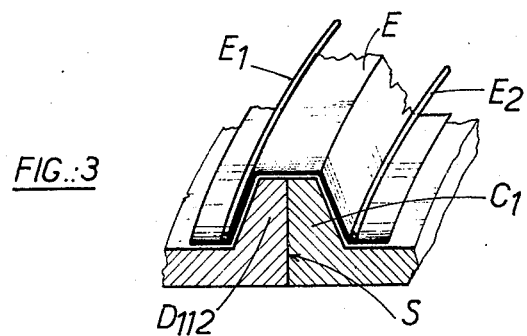
FIG.:3
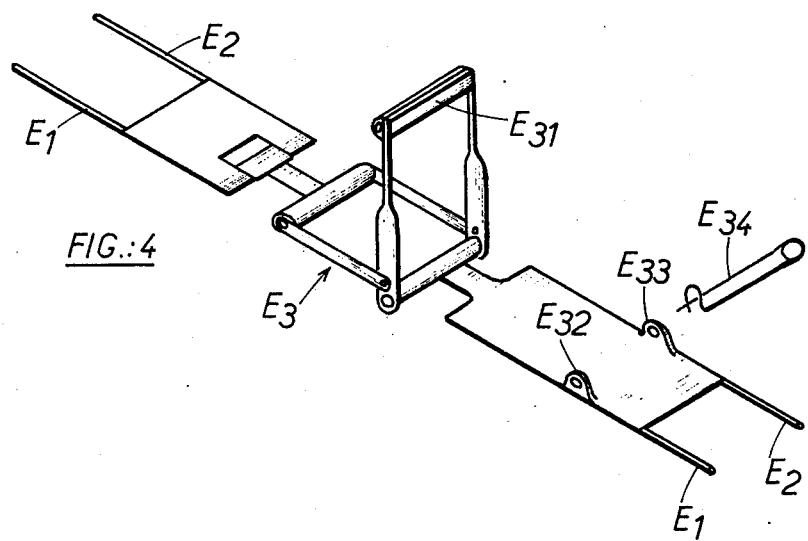
FIG.:4
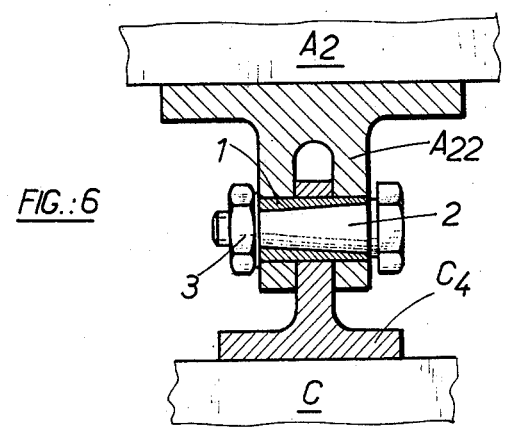
FIG.:6

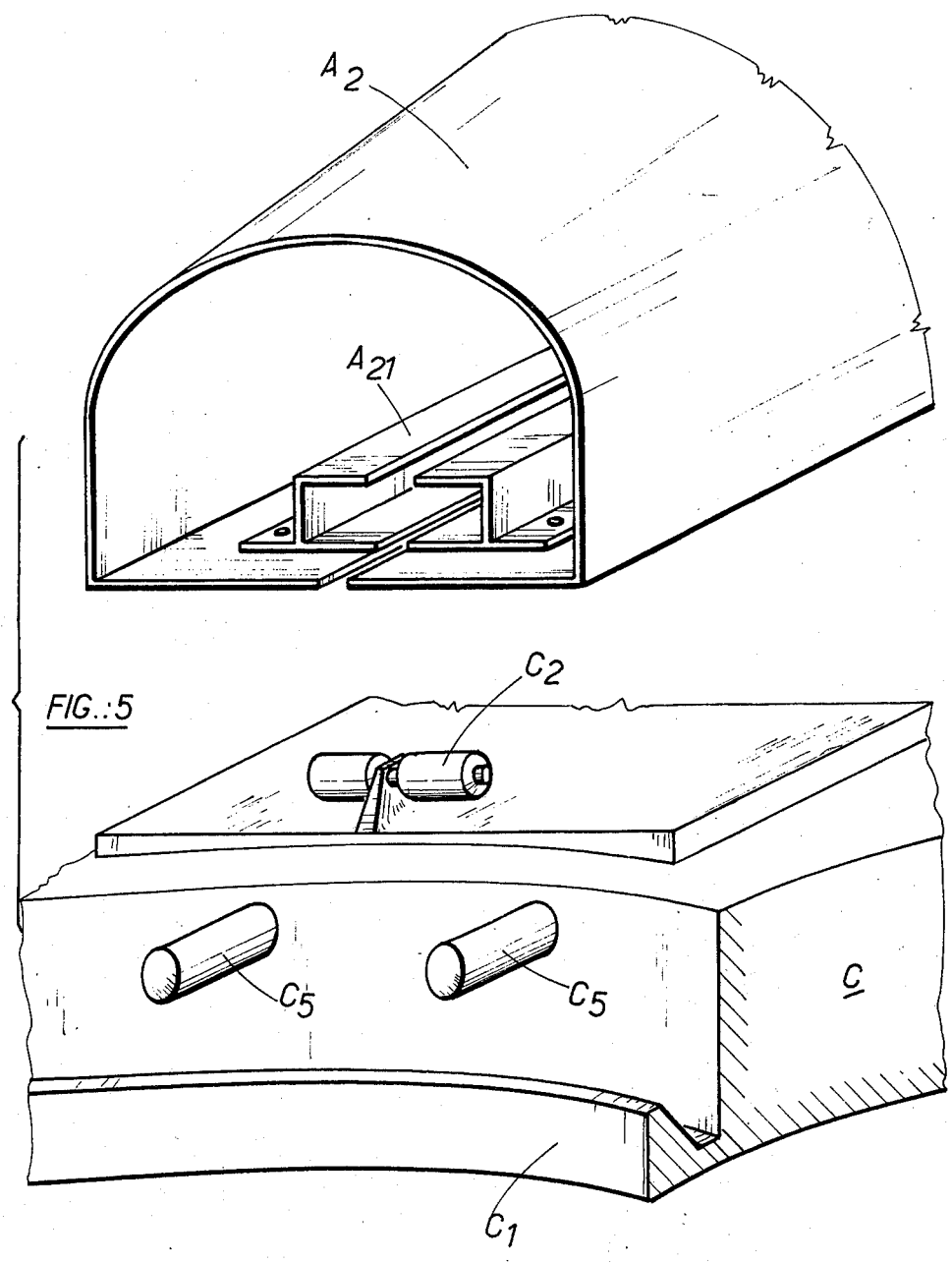
FIG.:5

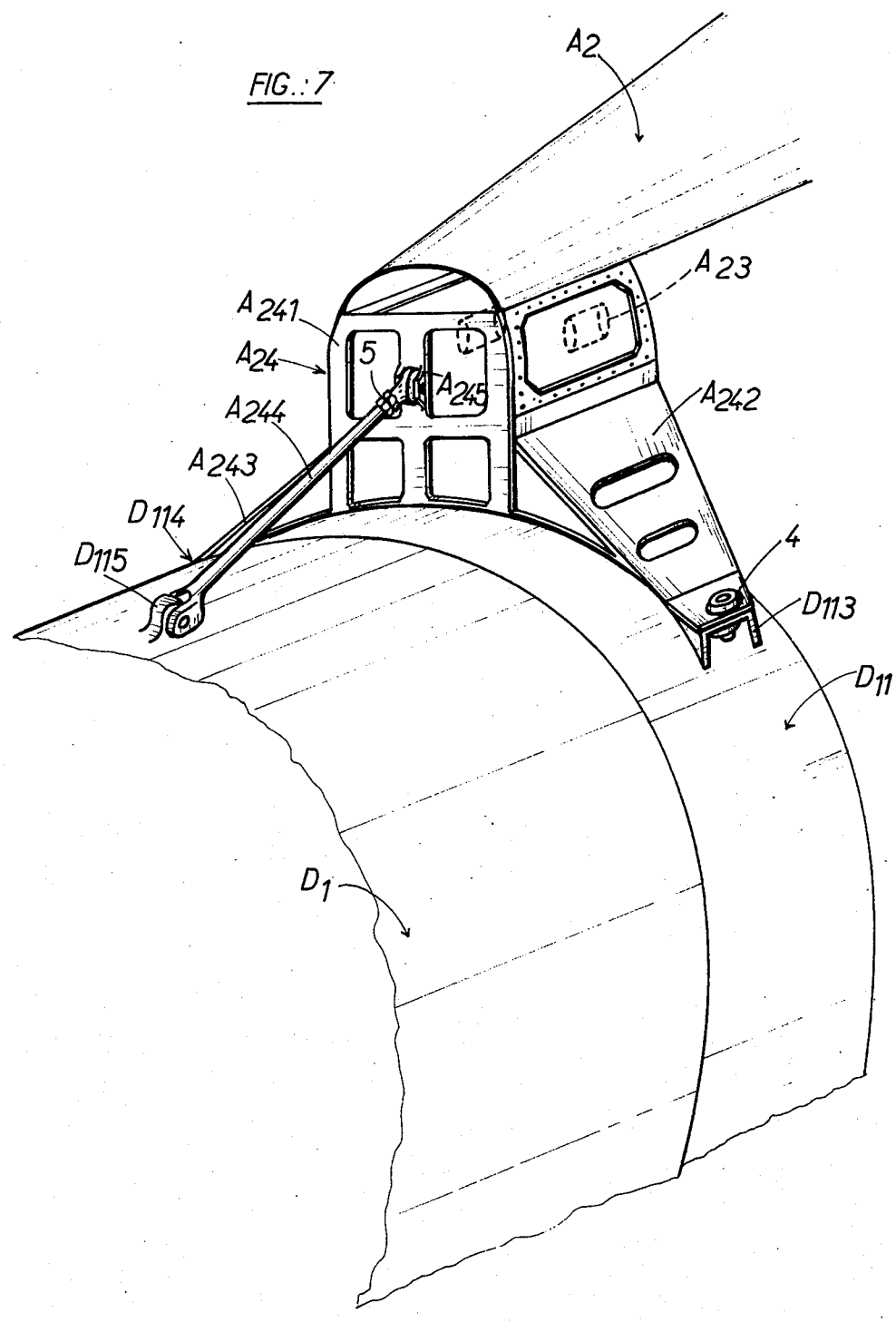

DEVICE FOR MOUNTING A TURBOREACTOR ON AN AEROPLANE

BACKGROUND OF THE INVENTION

The present invention has as its object a device for mounting in a nacelle on an aircraft a turbojet engine (hereinafter referred to as "engine") contained in a casing, the said device being of the type comprising a support structure or mast member integral with the airframe and forming a projection from the latter, as well as a nacelle coaxial to the engine. It is applied more particularly, although not exclusively, to the mounting of a double-flux engine of the upward blower type.

Mounting in a nacelle - of which the main point, in the case of a high-winged aircraft, is to suspend the reactor cleanly underneath the level of the wings — has among other advantages, those of disturbing only slightly or not at all the aerodynamic deportment of the wing and facilitating accessibility to the floor of the reactor. It is applied in particular to the equipment of large aircraft.

The known devices for mounting in a nacelle generally comprise two attachment systems, namely a front attachment system and a rear attachment system, permitting transfer of the forces due to the pressure and to the flight loads, directly from the engine to the mast, and conversely. Each of these attachment systems is of the "punctual" type, comprising a single or, at the most, two points of attachment to the engine casing.

Such a method of mounting necessarily entails as a consequence of concentration of forces, notably axial (due to the propulsive pressure or braking of the reactor, and to the horizontal forces of inertia) and vertical (due to the weight and to the vertical forces of inertia), to the points of attachment under consideration. As the casing is relatively thin, it consequently undergoes, during operation, deformations which are greater the higher the forces themselves in question, and which beyond a certain threshold can have an unfavourable effect on the performances of the engine. A problem is thus posed, and it is to be understood that it concerns more particularly the mounting of the engines which generate great pressure, such as the double-flux reactors at a rate of high dilution, used for equipping large transport aircraft.

SUMMARY OF THE INVENTION

The present invention aims to provide a device for mounting a turbojet engine in a nacelle on an aircraft, permitting a transfer of forces under better conditions than the known devices.

For this purpose, the nacelle is axially mobile between an active or advanced position and an inactive or remote position and the casing of the engine is linked directly to the mast, so that the engine is still supported when the nacelle is in an inactive and remote position.

The invention provides therefore a device for mounting a turbojet engine on an aircraft in a nacelle contained in a casing, the said device being of the type comprising a mast member integral with the aircraft, a rear nacelle section coaxial to the turbojet engine and means for releasably connecting the rear nacelle section to the mast member, characterized in that it comprises, in addition, sliding guide means permitting the rear nacelle section to be displaced parallel to the longitudinal axis of the engine, along the mast between an active or advanced position, in which the rear nacelle section is supported against the casing of the compressor and an inactive and remote position, in which the nacelle is separated from the said casing; and unitary linking means directly connecting the casing of the compressor to the mast, with a view to ensuring support of the turbojet engine when the rear nacelle section is in an inactive or remote position.

As stated above, the invention is applicable more particularly to the mounting of a double-flux engine of the upward compressor type confined by a compressor casing. In this case, the quick release locking means mentioned above, as well as the unitary linking means are advantageously intended for the compressor casing and they are arranged, as far as the said quick release locking means are concerned, in order to apply a downward annular flange of the said compressor casing and an upward annular flange of the rear nacelle section one against the other.

According to an advantageous embodiment applicable in this last case, the intermediate nacelle section comprises a side gate member as a hood is articulated to the mast around an axis substantially parallel to the longitudinal axis of the turbojet engine, in order to be able to pivot between an open position in which it permits access from the exterior to the said compressor casing (for example for maintenance purposes) and a closed position in which it completely surrounds this casing and re-establishes the continuity of the exterior peripheral surface of an assembly formed by the rear nacelle section and the front nacelle section fixed to an upwards annular flange of the said compressor casing.

BRIEF DESCRIPTION OF THE DRAWINGS

The invention will now be further described, by way of example, with reference to the accompanying drawings, in which:

FIG. 2a is a view of a longitudinal section of the said mounting device in the operational position (on this figure, the elements A3 and A4 have been taken as transparent);

FIG. 2b is a view similar to FIG. 2a showing the same mounting device in the position for maintenance of the turbojet engine; and FIGS. 3 to 7 are views on a larger scale in perspective (FIGS. 3, 4, 5 and 7) or in section (FIG. 6), illustrating various details of the device shown in FIGS. 1, 2a and 2b.

DESCRIPTION OF PREFERRED EMBODIMENTS

Figure 1:
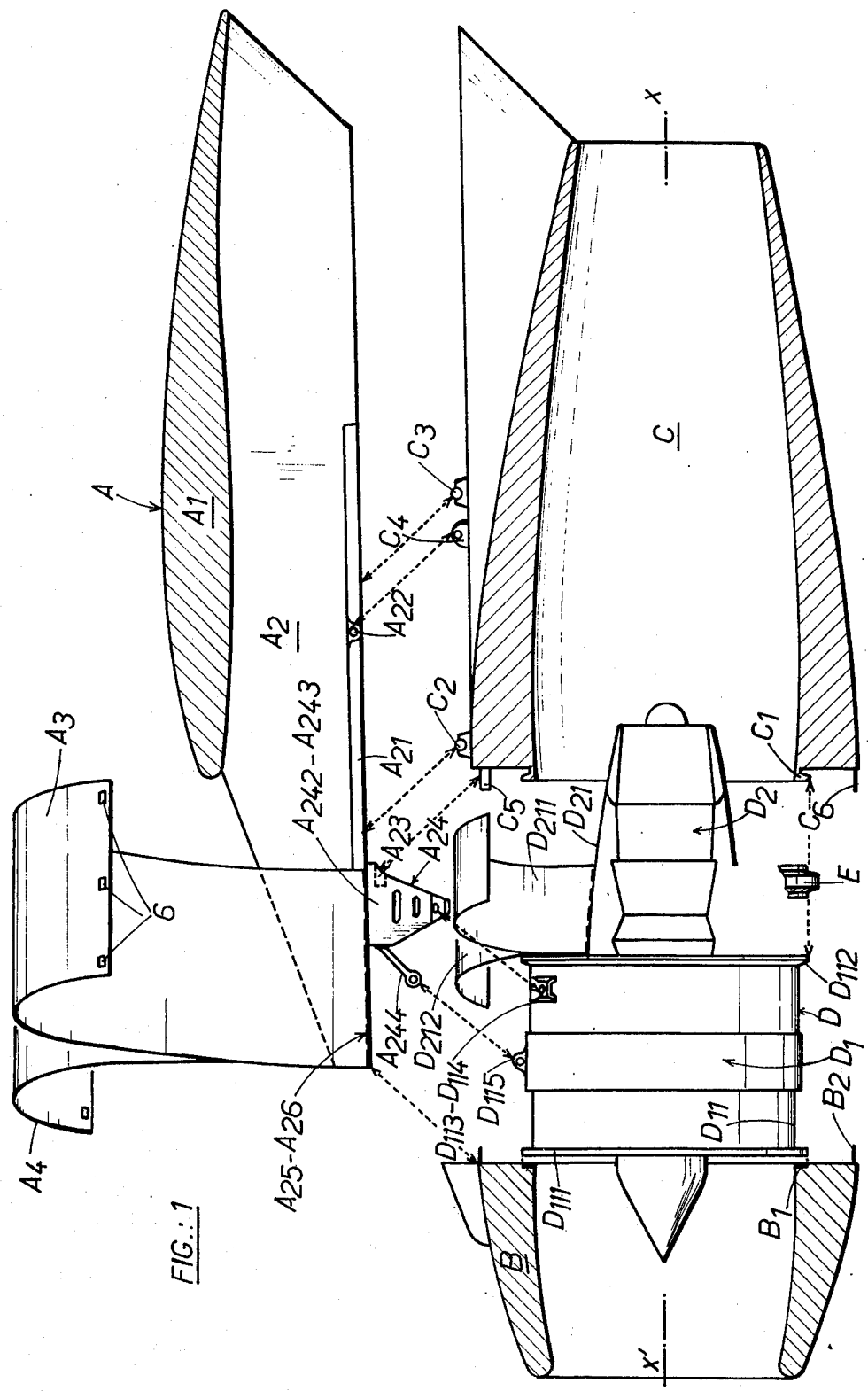
FIG. 1 is a view of a longitudinal section set out to show, separate from each other, the principal elements of a mounting device in a nacelle, in conformity with the invention, of a turbojet engine on an airframe.

In FIGS. 1, 2a and 2b an airframe is shown equipped with at least one turbojet engine D mounted below the level of a wing A of the aircraft. Reference $A_2$ indicates a support structure or mast member integral with the aircraft, advantageously formed by a longitudinal profiled rib forming a projection towards the base from the wing $A_1$.

In the example shown, the engine D, of which the longitudinal axis has been indicated by $x'-x$, is of the double-flux type comprising an upstream compressor D and a turbojet engine $D_2$ extending as an overhang downstream of the said compressor.

The compressor $D_1$ is defined exteriorly by a resistant casing $D_{11}$ which has an upstream flange $D_{111}$ and a downstream flange $D_{112}$. Likewise, the turbojet engine $D_2$ is defined exteriorly by a resistant casing $D_{21}$. These two casings are rigidly linked to each other, for example by arms or crosspieces $D_{12}$ (see FIG. 2a), and form together the casing of the engine. The downstream flange $D_{112}$ of the compressor casing has a rectangular trapezium profile.

The turbojet engine D is fed with air by a front nacelle section forming an air intake and it passes out in a rear nacelle section C, both coaxial to the said engine. The front nacelle section B has a downstream annular flange $B_1$, by which it is fixed (for example by bolting) to the upstream annular flange $D_{111}$ of the compressor casing $D_{11}$ (see FIG. 1). The rear nacelle section C is formed from a resistant structure, for example in the form of a casing capable of transmitting the considerable forces.

The device for mounting the engine on an aircraft will not be described. This device generally comprises the quick release locking means connecting the casing $D_{11}$–$D_{21}$ of the compressor to the rear nacelle section C following an annular surface of contact coaxial to the said compressor, and means for releasably connecting the said rear nacelle section to the mast member, in such a way as to permit transmission to the aircraft, through the intermediary of the rear nacelle section C and of the mast $A_2$, of the forces coming from the engine, and conversely.

The quick release locking means mentioned above comprise an annular flange $C_1$, with a rectangular trapezium profile, located on the upstream edge of the rear nacelle section C, opposite the annular downstream flange $D_{112}$ of the compressor casing $D_{11}$, and for applying these two flanges, one against the other, following an annular surface of contact S coaxial to the engine (see FIG. 3).

In the example shown, the means for applying the two flanges one against the other comprise a peripheral band E with a trapezoidal profile, overlapping the two flanges and pressed against the said flanges by stretched cables $E_1$ and $E_2$ visible in FIGS. 3 and 4. The cables $E_1$ and $E_2$ can be put under tension by means of an attachment system $E_3$ at the passage of dead point, comprising a lever $E_{31}$ of which the vacillation (in the direction of the arrow on FIG. 4) permits a strong traction to be exercised on the said cables. When the lever is brought to the active position, it is bolted in two covers $E_{32}$ and $E_{33}$ by a pin $E_{34}$.

It will be observed - and this observation is important - that the compressor casing $D_{11}$ is thus fixed to the rear nacelle section C following its entire periphery, as if the said casing and the said nacelle were "stitched" together.

Sliding guide means are provided for permitting the rear nacelle section C to be displaced parallel to the longitudinal axis $x'$-$x$ of the engine, between two extreme positions shown respectively on FIGS. 2a and 2b. On FIG. 2a the mounting device of the engine is in an operational form: the rear nacelle section C is in an active or advanced position, in which it is supported against the compressor casing $D_{11}$. On FIG. 2b the mounting device of the engine is in the maintenance form on the ground: the rear nacelle section C is separated from the said compressor casing, with a view to permitting access and maintenance of the engine.

The means permitting displacement of the rear nacelle section C comprise a guide track parallel to the longitudinal axis of the engine and formed, in the example shown, by a double rail $A_{21}$ (see FIG. 5) fixed to the lower part of the mast $A_2$ and on which rollers $C_2$ and $C_3$ fixed to the upper part of the nacelle can roll. It goes without saying that the reverse arrangement could be adopted, the rail and the rollers being carried respectively by the nacelle and by the mast. The rollers could also be replaced by gliding runners.

The means for releasably connecting mentioned above comprise an attachment shown in detail in FIG. 6, which connects an iron lug $C_4$ and a yoke $A_{22}$ respectively integral with the rear nacelle section C and the mast $A_2$. This attachment is advantageously of the type with an expansible tubular casing comprising a split socket 1 in which a conical pin 2 is engaged, of which the end is threaded and cooperates with a screw nut 3. When the screw nut is tight, the conical pin 2 dilates the split socket 2 which connects the yoke $A_{22}$ and the iron lug $C_4$ firmly between them.

The means for releasably connecting comprise, moreover, at least one positioning pin $C_5$ parallel to the axis $x'$-$x$ of the engine, and a aperture $A_{23}$ of a complementary form cooperating with the pin, the pin and the aperture being carried respectively by the rear nacelle section C and the mast $A_2$ or the reverse. In the example shown, two pins $C_5$ and two apertures $A_{23}$ have been provided.

Unitary linking means, shown in detail in FIG. 7, directly connecting the compressor casing $D_{11}$ to the mast $A_2$ without passing through the nacelle, serve as temporary suspension of the turbojet engine, used on the ground during maintenance operations, when the rear nacelle section is remote to give access to the turbojet engine.

These unitary linking means comprise a structural iron binding $A_{24}$ of which a central part $A_{241}$ is integral with the mast $A_2$ to which it corresponds in shape. From this central part extend three arms, namely two lateral arms $A_{242}$, $A_{243}$ extending in a tangential direction in proportion to the valve casing $D_{11}$, and a third arm $A_{244}$ extending in a direction having a component force parallel to the longitudinal axis $x'$-$x$ of the engine.

The two lateral arms $A_{242}$ and $A_{243}$ each have a free flat end which is fixed, by means of silent-blocks 4, on to bridges $D_{113}$ and $D_{114}$ integral with the blower casing $D_{11}$. The third arm $A_{244}$ is formed by a connecting rod of which one of the ends is articulated to a cover $A_{245}$ integral with the structural iron binding $A_{24}$, and of which the other end is articulated to an iron binding $D_{115}$ integral with the compressor casing $D_{11}$. The connecting rod $A_{244}$ is advantageously of a controllable length. For this purpose, it can be formed from two pieces screwed more or less deeply one in the other and blocked, one in proportion to the other, by a system of screw nut and lock-nut 5.

In the method of execution shown, the apertures $A_{23}$ which cooperate with the positioning pins $C_5$ of the rear nacelle section are carried by the structural iron binding $A_{24}$.

Between the front nacelle section B and the rear nacelle section C there extends a intermediate nacelle section comprising a side gate member formed from two mantles $A_3$ and $A_4$ each articulated to the mast $A_2$ around an axis $A_{25}$, $A_{26}$ (see FIG. 1) substantially parallel to the longitudinal axis $x'$-$x$ of the engine. As FIGS. 2a and 2b show, the two mantles can pivot between an open position (FIG. 2b) in which they permit access from the exterior to the compressor casing $D_{11}$, and a closed position (FIG. 2a) in which they completely surround the said compressor casing and reestablish continuity of the exterior peripheral surface of the assembly formed by the front nacelle section B and the rear nacelle section C.

In the closed position, the mantles $A_3$ and $A_4$ cover, near their downward and upward edges, a downstream flange $B_2$ of the front nacelle section B and an upstream flange $C_6$ of the rear nacelle section C (see FIG. 1). They are then locked to one another by means of a rapid attachment system 6, for example of the connecting rod type or the type at the passage of dead point (similar to that shown in FIG. 4).

The assembly connection of the different elements which have just been described has been shown by arrows on FIG. 1.

When the assembly is effected, the device for mounting a turbojet engine is in its operational form shown on FIG. 2a. It will be noted that, in this form, transmission of the forces from the turbojet engine D to the airframe A (and conversely) takes place by means of the rear nacelle section C and means for releasably connecting $C_4$–$A_{23}$. From the fact that the rear nacelle C section is "stitched" on its entire periphery to the compressor casing $D_{11}$ the concentration of forces is no longer produced on this compressor casing at one or two points only, which characterised the classical attachment systems, of the "punctual" type. The deformations of this casing under the effect of the pressure and the flight loads are therefore considerably reduced.

Likewise the casing $D_{21}$ of the turbojet engine part $D_2$ which makes a projection in the overhang beyond the compressor casing $D_{11}$ and which is therefore only linked to the said compressor casing, and this in a substantially uniform way on its entire periphery by means of the cross-pieces $D_{12}$ - is not submitted to the deformations usually produced by the classical attachment systems which generally link a single point of the back of the casing $D_{21}$ to the mast $A_2$.

It will be noted, moreover, that the rear nacelle section C being a structure with a large diameter, has a considerable moments of inertia which renders it particularly suitable for transmitting forces.

On the ground, when it is necessary to repair or service the turbojet engine, the rear nacelle section C is first of all separated from the mast $A_2$, by disengaging the iron lug $C_4$ from the yoke $A_{22}$ (see FIG. 6). The assembly can then be made to draw back from the nacelle, thanks to the rollers $C_2$ and $C_3$ which roll in the rail $A_{21}$, until the position shown on FIG. 2b is reached. It will be noted that in this form the turbojet engine D continues to be supported owing to the unitary linking means $A_{242}$–$A_{243}$–$A_{244}$. The "punctual" nature of these linking means is not an inconvenience, because they only intervene on the ground and are therefore only subjected to the single weight of the engine, which is much lower than the pressure and the other flight loads.

If one wishes to reach the compressor casing $D_{11}$ or equipment carried by the said casing, the two mantles $A_3$ and $A_4$ are unlocked and raised, and these can be held in the raised position by means of supports (not shown).

The raisable articulated mantles $D_{211}$ and $D_{212}$, similar to the mantles $A_3$ and $A_4$, can be provided on the turbojet engine part $D_2$ in order to form an exterior hood masking the internal equipment of this motor. By raising these mantles (see FIG. 1) when the rear nacelle section C is in the remote position, it is possible to reach the said equipment.

The mounting device conforming with the invention therefore also offers advantages for facilities for servicing the engine on the ground.

It goes without saying that the method of realisation described is only an example and that it would be possible to modify it, notably by the substitution of equivalent techniques, without departing from the scope of the invention as defined in the appended claims.

What is claimed is:

1. A composite nacelle for housing on an airframe a turbojet engine developing forces, comprising:
    a front nacelle section forming an air intake,
    a compressor casing having an upstream end connected to said air intake and a downstream end axially spaced from said upstream end, said compressor casing being integral with said turbojet engine,
    a mast member integral with said airframe,
    unitary linking means between said mast member and said compressor casing for both supporting said turbojet engine and for transmitting said forces therefrom to said airframe,
    a rear nacelle section having an upstream end connected with the downstream end of the compressor casing and a downstream end forming a gas exhaust,
    an intermediate nacelle section between said front and rear nacelle sections, comprising a side gate member selectively movable to a closing position wherein said side gate member covers said unitary linking means and said compressor casing and to an opening position wherein said side gate member provides access thereto,
    quick release locking means for connecting said rear nacelle section to said downstream end of the compressor casing,
    sliding guide means between said rear nacelle section and said mast member for permitting longitudinal relative displacement of said rear nacelle section, and
    means for releasably connecting said rear nacelle section to said mast member to permit said longitudinal relative displacement of said rear nacelle section, whereby practical maintenance of said turbojet engine is made possible.

2. A composite nacelle as claimed in claim 1, wherein said sliding guide means comprises a guide track integral with said mast member, and motion members provided on said rear nacelle section for permitting longitudinal relative displacement of said rear nacelle section.

3. A composite nacelle as claimed in claim 1, wherein said unitary linking means comprises:
    two lateral arm members linking said mast member to said compressor casing and extending in a tangential direction to said compressor casing,
    a front arm member linking said mast member to said compressor casing and extending in an upstream direction having a component force parallel to the longitudinal axis of said compresssor casing.

4. A composite nacelle as claimed in claim 1, wherein said quick release locking means comprises:
    a first annular flange integral with said downstream end of the compressor casing,
    a secondannular flange integral with said upstream end of said rear nacelle section,
    a peripheral overlap member overlapping said first annular flange and said second annular flange,
    means for fitting said peripheral overlap member on said first annular flange and said second annular flange.

5. A composite nacelle as claimed in claim 4, wherein said means for fitting comprises:
- two cable members fitting on two rims of said overlap member,
- two extremity members maintaining extremities of said cable members,
- a quick attachment member binding said extremity members for tightening said cable members on said overlap member.

6. A composite nacelle as claimed in claim 1, wherein means for releasably connecting said rear nacelle section to said mast member comprises:
- a yoke provided with holes,
- a lug provided with a hole, sliding in said yoke to permit longitudinal relative displacement of said rear nacelle section,
- a pin means connecting said lug to said yoke.

7. A composite nacelle as claimed in claim 6, wherein said plug means comprises:
- an expansible tubular casing crossing said yoke and lug,
- a conical pin extending through said expansible tubular casing, wherein it cooperates to expand said tubular casing.

8. A composite nacelle as claimed in claim 6, wherein means for releasably connecting further comprises a positioning means between said rear nacelle section and intermediate nacelle section comprising a pin extending longitudinally to permit said longitudinal relative displacement of said rear nacelle and an aperture cooperating with said pin.

9. A composite nacelle as claimed in claim 1, wherein said turboject engine integral with said compressor casing comprising an exterior hood masking internal equipments of said turbojet engine further comprises a gate member providing access to said internal equipments when said rear nacelle section is separated from said intermediate nacelle section.

* * * * *